Nov. 19, 1968  L. H. WILKIE  3,412,233
ELECTRICALLY HEATED PLIER-TYPE SOLDERING TOOL
Filed Dec. 30, 1965

INVENTOR.
LON H. WILKIE
BY
Anderson, Spangler & Wymore
ATTORNEYS

United States Patent Office 3,412,233
Patented Nov. 19, 1968

3,412,233
ELECTRICALLY HEATED PLIER-TYPE
SOLDERING TOOL
Lon H. Wilkie, 6092 Estes St.,
Arvada, Colo. 80002
Filed Dec. 30, 1965, Ser. No. 517,733
3 Claims. (Cl. 219—230)

ABSTRACT OF THE DISCLOSURE

A plier-type soldering tool for making sweated joints between copper pipes and fittings has a pair of insulated jaws carrying electric resistance heating elements. Interconnecting the handles and the jaws of the tool are shields that encase all but the workpiece engaging surfaces of the jaws. The shields are insulated from the jaws and also hold the latter in spaced relation to the handles so as to keep the handles from getting too hot to hold. The workpiece engaging surfaces of each jaw is provided with a pair of V-shaped notches of different depths so as to accommodate pipes and fittings of various diameters.

---

This invention relates to soldering devices and, more particularly, to an electric plier-type soldering tool specifically designed for use in making sweated joints between copper pipe and fittings.

For the past several years, copper pipe and fittings have replaced more and more galvanized pipe in both residential and commercial plumbing and heating installations. Galvanized pipe rusts and is more difficult and time-consuming to install because of the threaded joints and the problems associated with cutting it to the precise length required. Copper, on the other hand, is easy and fast to cut, lightweight and flexible enough to permit moderate amount of bending without the need for a complex assemblage of fittings.

Copper piping installations are customarily made with sweated joints throughout, the latter being made with a torch, flux and solder. The adjoining portions of the pipe and fitting are first polished with steel wool or the like until all the oxides have been removed and the mating surfaces are clean and bright. Next, these surfaces are coated with flux and heated with a torch to the temperature above the melting point of the solder while joined together in assembled relation; whereupon, a small amount of solder is applied to the joint and is immediately drawn into and around the interface by capillary action to complete the connection.

The use of a torch to heat up the joint as above-noted has certain disadvantages. To begin with, in certain installations, the joint lies in close proximity to floor joists, studs and walls which became scorched by an open flame due to the difficulty in controlling the latter. Fire, while rare, especially when the installation is being made by an experienced plumber or heating man, does sometimes occur.

Secondly, a torch directs the flame onto a small specific area of the joint and, even though copper is an excellent heat conductor, remote "cold spots" may exist which will cause the solder to chill and set up before it has a chance to complete the joint. When this occurs, a leak results in the imperfect connection. The foregoing is an especially difficult problem to overcome in making sweated joints in large-diameter copper pipe, some of these requiring several hours to complete.

Another problem is handling the torch, solder, pipe and fitting with only two hands. If the joint to be soldered stays assembled by itself, there is, of course, no problem in holding the torch and solder other than the fact that the torch is a large bulky tool which is tiresome to hold and difficult to maneuver in confined spaces. All too often, the elements to be joined together must be held in assembled relation while the solder is applied and, in this instance, it would be quite handy to be able to fasten the heating tool temporarily to the fitting so as to free one hand.

Finally, the rapidity with which the joint can be soldered using a torch leaves something to be desired. While the heat given off by the flame is quite intense, it is also highly localized and must be physically directed onto other areas or rely on conduction to spread the heat throughout the elements being joined together.

From the above, it would seem that an ideal sweated joint soldering tool would be one operating on the principle of electric resistance-heating where the heat developed therein could be confined to the precise areas requiring same. If possible, the heat would be applied more or less uniformly around the entire joint rather than in a localized fashion. A tool having "jaws" which were adjustable to accommodate pipe and fittings of the various diameters would, of course, increase its versatility substantially. Plier-type handles for actuating the jaws would provide a simple, compact and easily-operated unit and, if necessary, these handles could incorporate the well-known "toggle-connection" or some other type of latch whereby the tool could be temporarily locked onto the fitting. Lastly, the heat developed in the jaws should, preferably, be sufficient to heat the elements to be joined together up to the required temperature above the melting point of the solder in a relatively short time, say less than a minute.

It has now been found in accordance with the teaching of the instant invention that these and other desirable ends can be achieved by means of an electric plier-type hand tool having resistance heating elements mounted in both of the specially-designed jaws. These jaws are shaped to provide multi-point contact with the workpiece and accommodate pipes and fittings of various diameters. The resistance heating elements contained therein are capable of heating up the fitting and pipe to a temperature well above that necessary to melt the solder in a matter of thirty seconds or less.

It is, therefore, the principal object of the present invention to provide a novel and improved soldering tool for sweated joints.

A second objective is the provision of a tool of the type aforementioned which is of the hand-held, plier-type having jaws capable of accommodating pipe and fittings of various diameters.

Another object of the invention herein described and claimed is to provide a plier-like electric soldering tool whose jaws are designed to make multi-point contact with the workpiece.

Still another objective is the provision of a soldering tool incorporating a pair of resistance-heating elements in the jaws thereof that produce a controlled intense heat of sufficient intensity to complete a soldered joint in less than a minute.

An additional object is to provide a tool of the type above-described that has the heating elements in heat-conductive relation to the jaws but said jaws in heat-insulating relation to the handles.

Further objectives of the herein described invention are to provide a soldering tool that is simple, lightweight, compact, versatile, safe, inexpensive, rugged, easy to use, trouble-free and decorative in appearance.

Other objects will be in part apparent and in part pointed out specifically hereinafter in connection with the description of the drawings that follows, and in which.

Figure 1:
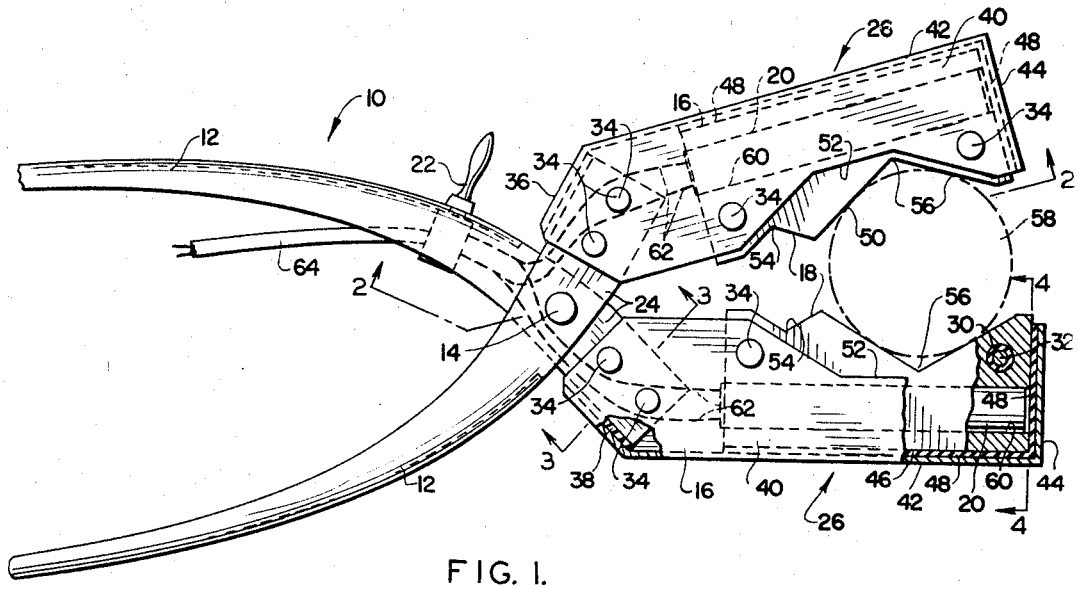
FIGURE 1 is a side elevation of the electric soldering tool of the present invention, portions of which have been broken away and shown in section to better reveal the interior construction.

Referring now to the drawings for a detailed description of the present invention and, initially, to FIGURE 1 for this purpose, reference numeral 10 has been employed to identify the tool in its entirety and the latter will be seen to include a pair of handles 12 pivotally connected to one another at 14 to provide a scissor-like action, a pair of heating element shields 16 attached to the handles and insulated therefrom, a pair of jaw elements 18 fastened within the shields in insulated relation thereto, a pair of resistance heating elements 20 mounted in the jaw elements, and a switch 22 for controlling the heating elements. The handles 12, in the particular form shown, are of the simple, well-known "plier-type" connected together by pivot pin 14 located adjacent one extremity. Their significance to the present invention lies solely in their age-old functions of providing means for holding the tool and actuating the jaws thereof. In this respect, it is to be noted that the simple plier-type handles shown are intended as being merely representative of the many handles known in the art that perform these same functions in much the same way along with, in some instances, other supplementary functions that might be of benefit here. For instance, handles of the toggle-type shown in U.S. Patent to Jones No. 2,514,130 as well as those employing a releasable latch between the handles to lock the jaws onto a workpiece could, of course, be substituted for those illustrated without the exercise of invention in those applications where it was desirable to be able to lock the tool onto the fitting and free one hand to be used for other purposes. Each handle 12 has a connector portion 24 projecting beyond the pivot pin 14 to which the jaw-subassemblies that have been broadly indicated by reference numeral 26 are attached.

Figure 2:
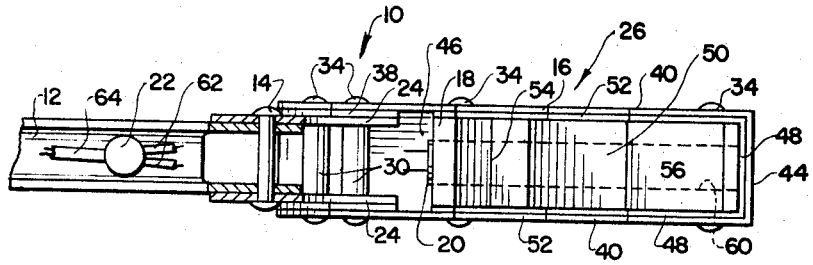
FIGURE 2 is a fragmentary section to an enlarged scale taken along line 2—2 of FIGURE 1 showing the jaw design.
Figure 3:
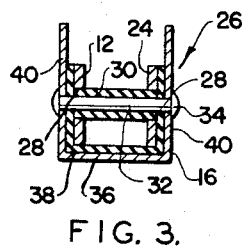
FIGURE 3 is a section taken along line 3—3 of FIGURE 1.
Figure 4:
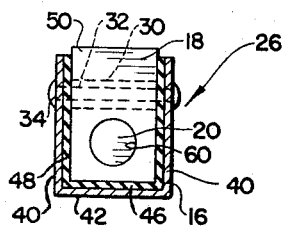
FIGURE 4 is a section taken along line 4—4 of FIGURE 1.

Next, with reference to FIGURES 2 and 3, it will be seen that these connecting portions 24 of the handles 12 contain fastener openings 28 which are oversized to accommodate insulating sleeves 30 that insulate the shanks 32 of the rivet-type fasteners 34 from the metal of said handle extensions. In addition, the remote faces of the handle extensions 24 as well as the edges thereof that lie facing the web 36 of shield 16 are insulated from the adjacent faces of the latter by generally U-shaped insulator 38. Thus, the handles 12 are protected against heat being conducted thereto from either shield 16 or rivet-type fastener 34. Additional insulation may, of course, be applied directly to the handles in the form of sleeves or a coating (neither of which has been illustrated) in the same manner as is done with electrical pliers; however, it has been found that it is better to insulate the jaw subassemblies 26 so that the handles do not get hot in the first place. Two rivets 34 are used in connecting the jaw subassemblies to the handle extensions as shown in FIGURES 1 and 2 so that they do not tilt relative to one another.

All four figures of the drawing disclose portions of the shields 16 which will be seen to comprise a single sheet of metal bent to provide side-walls 40 interconnected by a topwall 42 and closed at the front end by an end-wall 44. Web 36 comprises a continuation of topwall 42 and is inclined at approximately a 45° angle relative thereto so as to parallel the opposing surface of the handle extensions 24 and yet leave the jaw subassemblies 26 parallel to one another when in closed position as shown most clearly in FIGURE 1. A cavity 46 is thus formed within each shield between front endwall 44 and the handle extensions 24 adapted to receive the jaw elements 18 which are fastened between the sidewalls 40 thereof by additional rivets 34 whose shanks 32 are insulated therefrom by insulating sleeves 30. These jaw elements lie spaced forwardly of the handle extensions and are kept out of contact with the opposing shield surfaces by an insulation barrier 48. Insulation barrier 48 effectively reduces the heat transferred to the shield so that the latter remains relatively cool and insulation 38 between the shield and handle cooperates with insulation 48 to block nearly all heat transfer to the handles except, perhaps, for a little convection heating across the air gap left between the jaw elements and handle extensions inside the shield that could also be eliminated with a heat-reflecting baffle if such became desirable.

The opposed workpiece-engaging surfaces 50 of the jaw elements 18 project beyond the free edges 52 of the shield sidewalls which are cut away as shown in FIGURE 1 to expose same.

The work-gripping jaw surfaces 50 each have two shallow V-shaped notches 54 and 56 cut therein. The forwardmost notch 56 is the deeper of the two and the angle formed at the apex thereof is preferably somewhat greater than a right angle. The rear notch 54, in the particular form illustrated, has the same angle at the apex as the front one, however, it is considerably shallower. Both notches cooperate with the corresponding notches in the opposite jaw element to form a generally "diamond-shaped" opening when the jaws are closed. The front pair of notches 56 will accommodate several different diameters of pipe and fittings and make four-point contact with each as shown by dotted lines in FIGURE 1 at reference numeral 58. The rear pair of notches 54 work in the same way but on pipe and fitings of smaller diameter, say ¼", ⅜" and ½" outside diameter. The front notches will accommodate up to about 1½" O.D. copper pipe and fittings which are as large as are commonly found in residential heating and plumbing installations.

Both jaw elements 18 are fabricated from iron, copper, steel or some other metal or alloy thereof having good heat transfer characteristics. Each also includes a longitudinal bore 60 extending the full length thereof paralleling the work-gripping surfaces 50 in close proximity thereto. Into these bores are placed tubular high intensity resistance heating elements 20 of the same general type employed as stove heating elements, etc. These heat tubes are commercially-available from several manufacturers and they develop temperatures considerably above that needed to melt solder. The leads 62 from these heating elements pass rearwardly through the shields and join one another at switch 22 in the handle. A common two-wire lead 64 goes from the switch to a 110 v. A.C. source.

Having thus described the several useful and novel features of the plier-type electric soldering tool of the present invention, it will be apparent that the many worthwhile objectives for which it was developed have been achieved. Although but a single specific embodiment of the invention has been illustrated, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. The plier-type hand tool for sweating joints on tubular goods which comprises: a pair of handle-forming elements pivotally interconnected adjacent one end for plier-like action, a pair of jaw subassemblies mounted on the handles and responsive to actuation of the latter to grip a workpiece, each of said jaw subassemblies including a solid metal jaw member having a workpiece engaging surface and a heating element cavity in heat-conducting relation to said surface, a tubular electric resistance heating element mounted in the heating element cavity of each jaw member adapted upon energization to heat the workpiece engaging surface thereof to a temperature in excess of the melting point of soldier, a rigid shield member encasing the exposed surfaces of each jaw member with the exception of the workpiece engaging surface thereof, said shield member including a portion connected to the adjacent handle element adapted to maintain a fixed-spaced relation between said handle element and its associated jaw member, and means interposed between the jaw members and handle elements for preventing the heat developed in the heating elements from reaching the latter.

2. The plier-type electric soldering tool as set forth in claim 1 in which: the means interposed between the jaw members and handle elements for preventing the heat developed in the heating elements from reaching the latter comprises a first layer of insulating material interposed between the adjacent surfaces of the jaw members and shield, and a second layer of insulating material between the adjacent surfaces of said shield and handle elements.

3. In combination in a tool for making sweated soldier joints between male and female tubular workpieces which comprises: a pair of solid metal jaw members having opposed workpiece engaging surfaces each containing at least one shallow V-shaped notch, and said jaw members having a cavity therein adapted to receive a cylindrical heating element located in close proximity to said workpiece engaging surface, an insulation barrier covering the exposed surfaces of said jaw members with the exception of said workpiece engaging surface, a shield member encasing the insulated surfaces of each jaw member, a cylindrical resistance heating element mounted in the heating element cavity of each jaw member adapted upon energization to heat the workpiece engaging surfaces thereof to a temperature in excess of that required to melt solder, and means connected to the shield members adapted upon actuation to clamp the jaw elements onto a tubular workpiece.

References Cited

UNITED STATES PATENTS

| | | | |
|---|---|---|---|
| 1,204,131 | 11/1916 | Clemens | 219—230 X |
| 1,378,040 | 5/1921 | Langguth | 18—18 |
| 1,422,826 | 7/1922 | Brown | 219—240 X |
| 1,465,838 | 8/1923 | Caneavri | 219—533 X |
| 1,845,475 | 2/1932 | Benson | 219—231 |
| 2,001,538 | 5/1935 | Mueller et al. | 219—535 X |
| 2,099,792 | 11/1937 | Beadling | 219—237 |
| 2,226,194 | 12/1940 | Berolsky | 228—51 |
| 2,257,376 | 9/1941 | Grey | 219—238 X |

FOREIGN PATENTS

| | | |
|---|---|---|
| 987,604 | 4/1951 | France. |
| 480,374 | 2/1938 | Great Britain. |

ANTHONY BARTIS, *Primary Examiner.*